United States Patent
Gutweiler et al.

Patent Number: 5,466,751
Date of Patent: Nov. 14, 1995

[54] PLASTICIZED POLYMER MOLDINGS MADE FROM MODIFIED POLYVINYL BUTYRALS

[75] Inventors: Matthias Gutweiler, Taunusstein; Matthis Kroggel, Kelkheim, both of Germany

[73] Assignee: Hoechst Aktiengesellschaft, Frankfurt, Germany

[21] Appl. No.: 271,737

[22] Filed: Jul. 7, 1994

[30] Foreign Application Priority Data

Jul. 16, 1993 [DE] Germany ............ 43 23 897.1

[51] Int. Cl.$^6$ ............... C08L 29/02; C08L 29/04
[52] U.S. Cl. ............... 525/58; 525/56; 525/154; 525/328.8; 525/343
[58] Field of Search ............ 525/58, 56, 328.8, 525/343, 58, 154

[56] References Cited

U.S. PATENT DOCUMENTS

| | | | |
|---|---|---|---|
| 4,205,146 | 5/1980 | Hermann et al. | 525/61 |
| 4,600,655 | 7/1986 | Hermann et al. | 428/437 |
| 4,968,744 | 11/1990 | Misra et al. | 525/57 |
| 4,970,253 | 11/1990 | Hermann et al. | 524/296 |
| 4,999,253 | 3/1991 | Misra et al. | 428/515 |
| 5,030,688 | 7/1991 | Misra et al. | 525/61 |

FOREIGN PATENT DOCUMENTS 0594026  10/1993  European Pat. Off. .

OTHER PUBLICATIONS

EP 0,368,830 A1 (Abstract only) May 16, 1990.
EP 0,368,831 A2 (Abstract only) May 16, 1990.
EP 0,368,832 A2 (Abstract only) May 16, 1990.
DE 0594026 (Abstract only) Oct. 11, 1993.

*Primary Examiner*—W. Robinson Clark
*Attorney, Agent, or Firm*—Foley & Lardner

[57] ABSTRACT

A plasticized polymer molding that includes a plasticizer and polyvinyl butyral is disclosed. The polyvinyl butyral includes comonomer units carrying sulfonate groups in the main polymer chain of the polyvinyl butyral. The molding is useful as intermediate films in laminated glass sheets.

19 Claims, No Drawings

PLASTICIZED POLYMER MOLDINGS MADE FROM MODIFIED POLYVINYL BUTYRALS

BACKGROUND OF THE INVENTION

1. Field of Invention

The invention relates to plasticized polymer moldings made from modified polyvinyl butyrals and to methods for their preparation and their use. The modified polyvinyl butyrals (PVBs) are useful in plasticized form, for example, as interlayer films having improved rheological and mechanical properties for the production of glass laminates.

2. Description of Related Art

As is known, plasticizer-containing polyvinyl butyrals have long been processed in large amounts as thermoplastics. In particular, they have been extruded to give films which are used as interlayers in multilayer silicate laminate glasses, preferably for motor vehicle windshields, architectural glasses for the construction industry and for bulletproof glass screens.

It is known that the penetration resistance of a finished glass laminate is affected by the mechanical properties of the laminating film. Therefore, very high film strengths are desired.

It is furthermore known that the rheological behavior of plasticized PVB compositions is of great importance in laminate production, in particular in prelaminate production. Thus, the actual laminate production in the autoclave is preceded by a further process step. In this so-called prelamination process, a prelaminate is deaerated under pressure in a heating zone from 60° to 110° C. The high quality of the prelaminate produced in this way is a prerequisite for the production of the final laminate in the autoclave. The flow behavior of the film in the above-mentioned temperature range plays a crucial role here. Thus, inadequate flowability of the film results in incomplete contact between the silicate glass sheets and the laminating film. This is caused by thickness variations in the film and by glass flexing defects, which can result in visible glass delamination and air bubbles.

Between adequate flowability of the film and the highest possible film strength, there is an optimization problem. Thus, for example, increased film strength can be achieved by reducing the plasticizer content. However, this likewise results in lower flowability of the films. Polyvinyl butyrals having an increased proportion of free hydroxyl groups have higher film strengths, but likewise exhibit reduced flowability levels. A further disadvantage of these polyvinyl butyrals having an increased hydroxyl group content is the incompatibility with certain plasticizers, for example dihexyl adipate, which can result in exudation of the plasticizer.

EP-A 0 368 830, 0 368 831 and 0 368 832 describe polyvinyl butyrals containing sulfonate groups in side chains, plasticized polyvinyl butyral films produced therefrom and films made from blends of standard polyvinyl butyrals containing no sulfonate groups and polyvinyl butyrals containing sulfonate groups. These are ionomeric polyvinyl butyrals which are prepared from standard polyvinyl alcohols containing no sulfonate groups by acetalation by means of aldehydes containing sulfonate groups. A disadvantage here is the risk of recleavage of the aldehydes containing sulfonate groups, which can result in undesired secondary reactions. In addition, the particularly preferred aromatic aldehydes containing sulfonate groups impart undesired UV sensitivity on the laminating film, which can result in discoloration or degradation reactions in the laminating film on corresponding exposure of a glass laminate. A further disadvantage is the relatively high price of aldehydes containing sulfonate groups. These disadvantages prevent the films from being used on a large industrial scale as laminating films in glass laminate screens.

SUMMARY OF THE INVENTION

There is therefore a desire for polyvinyl butyral laminating films which have better film strengths than known laminating films without the flowability dropping in the temperature range of the prelamination process. It has now been found, surprisingly, that this can be achieved by using laminating films made from plasticized polyvinyl butyrals containing sulfonate groups.

One object of the present invention is to develop a polyvinyl butyral laminating film containing sulfonate groups which avoids the above-mentioned disadvantages and can be obtained by plasticizing extrusion of plasticizer-containing polyvinyl butyrals containing sulfonate groups or mixtures of polyvinyl butyrals containing sulfonate groups, with polyvinyl butyrals containing no sulfonate groups which are suitable for the production of laminating films.

Another object of the present invention is to produce a polyvinyl butyral which carries sulfonate groups in the main polymer chain. Another object of the present invention is to provide a process for the production of polyvinyl butyral carrying sulfonate groups in the main polymer chain.

Still another object of the present invention is to provide the polyvinyl butyral made by the process of the present invention. Yet another object of the present invention is to provide a laminated glass product.

In accomplishing the foregoing objects, there has been provided according to one aspect of the present invention, a plasticized polymer molding, which includes a plasticizer, and polyvinyl butyral which contains comonomer units carrying sulfonate groups in the main polymer chain of the polyvinyl butyral.

Another aspect of the present invention provides a process for the production of the plasticized polyvinyl butyral polymer molding and the molding so produced. The process includes the steps of: (i) acetalating starting polyvinyl alcohol, which comprises polyvinyl alcohol containing monomer units carrying sulfonate groups, with butyraldehyde in an aqueous solution in the presence of acid catalysts to form polyvinyl butyral carrying sulfonate groups in the main polymer chain thereof; (ii) neutralizing said polyvinyl butyral carrying sulfonate groups to obtain a neutralized polyvinyl butyral in powder form; (iii) mixing said polyvinyl butyral with plasticizers, stabilizers and auxiliaries; and (iv) forming said mixture into said polyvinyl butyral polymer molding. In a preferred embodiment, the comonomer units of the starting polyvinyl alcohol carrying sulfonate groups include ethene sulfonate.

Another aspect of the present invention provides a laminated glass product. The glass product includes the plasticized polyvinyl butyral carrying sulfonate groups polymer molding shaped in the form of at least one flat film having a thickness from about 0.2 to 2 mm, and at least two glass sheets. The at least one flat film is positioned and laminated between the at least two glass sheets as an intermediate film to form said laminated glass windshield.

DETAILED DESCRIPTION OF THE PREFERRED EMBODIMENTS

The present invention involves using polyvinyl butyrals containing sulfonate groups as obtained by acetalation of polyvinyl alcohols containing sulfonate groups. The alcohols containing sulfonate groups are generally prepared by free-radical copolymerization of, preferably, ethene sulfonate and vinyl acetate and subsequent saponification of the resultant copolymeric vinyl acetates carrying sulfonate groups to give polyvinyl alcohols containing sulfonate groups.

The preparation of these polyvinyl alcohols (PVALs) containing sulfonate groups is described in detail in U.S. patent application Ser. No. 08/138,121, now abandoned, which reference is hereby incorporated in its entirety.

The present invention therefore relates to plasticized polymer moldings made from plasticizer-containing copolymeric polyvinyl butyrals (PVBs) containing comonomer units which carry sulfonate groups and are derived from copolymeric polyvinyl alcohols (PVALs) containing the comonomer units, in the salt form, carrying sulfonate groups. The comonomer units carrying sulfonate groups are preferably in the polyvinyl butyrals in the form of their alkali metal salts.

The polyvinyl alcohols containing sulfonate groups can preferably contain from about 0.01 to 25% by weight, in particular from about 1 to 10% by weight, of comonomer units carrying sulfonate groups, preferably ethene sulfonate, based on the PVAL containing sulfonate groups.

The acetalation of the polyvinyl alcohols containing sulfonate groups is preferably carried out in aqueous solution by reaction with butyraldehyde in the presence of acids to give polyvinyl butyrals containing sulfonate groups. It is possible to either meter the acid into the polyvinyl alcohol/aldehyde mixture in the aqueous solution, or to meter the aldehyde into the polyvinyl alcohol/acid mixture. Reactions by adding all components at once can likewise be carried out, but frequently result in clumping of the reaction product formed. The polyvinyl alcohols containing sulfonate groups, which are chain-ionomeric macromolecules, can also be employed for the acetalation as a blend with standard polyvinyl alcohols, which are preferably nonionomeric macromolecules containing sulfonate groups. In this case, the proportion of these standard polyvinyl alcohols can preferably be up to about 95% by weight, in particular from about 50 to 90% by weight, based on the total amount of polyvinyl alcohol mixture to be acetalated.

The chain-ionomeric polyvinyl butyrals containing sulfonate groups prepared in this way are, especially useful for the production of laminating films, preferably blended with a polyvinyl butyral containing no sulfonate groups which are suitable for the production of laminating films. In this case, the proportion of chain-ionomeric polyvinyl butyrals can generally be up to about 60% by weight, preferably from about 2.5 to 35% by weight of the total weight of PVB.

The present invention also relates to a process for the preparation of the plasticized, plasticizer-containing PVBs carrying sulfonate groups. The process is generally carried out by acetalation of the parent starting PVALs carrying sulfonate groups, or mixtures of PVALs carrying sulfonate groups with starting PVALs containing no sulfonate groups by means of butyraldehydes, preferably n-butyraldehyde, in an aqueous solution with addition of acid catalysts. The acid catalysts can be any desired and are preferably one or a mixture of hydrochloric acid, sulfuric acid, nitric acid, and phosphoric acid. More preferable is phosphoric acid. The polyvinyl butyrals are generally either obtained directly in solid, neutralized powder form or are initially obtained in aqueous dispersion form and are subsequently dried by removal of water, preferably by spray-drying, and are likewise obtained in solid, neutralized powder form. If desired, the PVBs carrying sulfonate groups are mixed with PVB containing no sulfonate groups. The PVBs are mixed with plasticizers and, if desired, with conventional stabilizers and auxiliaries, and are then plasticized and, if desired, are thermoformed.

Generally, any acid which can be used for the preparation of the polyvinyl acetals known hitherto can be employed as catalysts for the acetalation of the polyvinyl alcohols. The acetalation is preferably carried out using strong acids, preferably inorganic acids, for example hydrochloric acid, phosphoric acid, sulfuric acid, nitric acid, and toluenesulfonic acid and dodecylbenzenesulfonic acid.

In order to prepare the polyvinyl butyrals, the polyvinyl alcohols containing sulfonate groups, or if desired, the mixtures of polyvinyl alcohols containing sulfonate groups and commercially available standard polyvinyl alcohols containing no sulfonate groups are dissolved in water. The concentration of the polymer solutions should preferably be between about 1 and 50% by weight, in particular between about 5 and 20% by weight. The polyvinyl alcohols are subsequently acetalated at generally conventional temperatures by conventional methods, preferably by metering the acid into the polyvinyl alcohol solution containing n-butyraldehyde.

The acid is preferably metered in over the course of 5 to 300 minutes, with vigorous stirring being advantageous. However, the reaction can also be carried out as a batch reaction. The amount of aldehyde to be added depends on the desired degree of acetalation. Due to the aldehyde conversion, which is generally incomplete, the use of the aldehyde in a slight excess, based on the respective stoichiometric requirement is preferred.

The aldehyde is particularly preferably employed in an excess of up to about 10 mol %, based on the stoichiometric requirement.

In a preferred embodiment, the acetalation is commenced at temperatures between about 0° C. and 15° C., after which the polyvinyl butyral formed immediately precipitates, usually in powder form, if it preferably does not have an excessive content of sulfonate groups. In order to complete the reaction, the reaction mixture is slowly warmed to room temperature, and if necessary a post-reaction lasting from about 1 to 5 hours at elevated temperatures, for example from about 20° to 80° C., is then carried out. The amount of acid used acting as a catalyst depends principally on the desired degree of acetalation and can preferably be up to about 1.1 eq, based on the molar vinyl alcohol unit content.

The polyvinyl butyral obtained, which is preferably in powder form, is filtered off with suction and washed with demineralized water. Complete neutralization of the acid is generally achieved by subsequent treatment of the polymer powder in dilute alkali hydroxide solution although neutralization can take place before filtering. To this end, the polymer suspension is preferably heated at from about 40° to 90° C. for about 1 to 4 hours at a pH which is generally in the range from 9 to 13, subsequently refiltered off with suction, washed with water until neutral and dried.

At higher sulfonate contents of the chain-ionomeric polyvinyl butyrals, self-dispersion of the polymer can occur during the acetalation. In this case, the neutralization of the acid takes place directly in the reaction batch without prior removal of the polymer. The resultant polyvinyl butyral suspension containing sulfonate groups is subsequently converted into a powder form by spray-drying or by freeze-drying or, if appropriate, by precipitation by means of organic solvents.

The PVALs containing sulfonate groups may be acetalated to any desired extent and are preferably acetalated to such an extent that they have, after the acetalation, a content of non-acetalated vinyl alcohol units of preferably from about 15 to 28% by weight, in particular from about 18 to 24% by weight, based on the polyvinyl butyral.

The polyvinyl butyrals carrying sulfonate groups are preferably based on mixtures of polyvinyl alcohols carrying sulfonate groups and polyvinyl alcohols containing no sulfonate groups. The proportion of PVALs carrying sulfonate groups is preferably from about 2.5 to 60% by weight, in particular from about 2.5 to 35% by weight, based on the total amount of the PVAL starting components. The $—SO_3^-$ content from the sulfonate groups in the copolymeric starting PVALs on which the polyvinyl butyrals carrying the sulfonate groups are based, or mixtures thereof with PVALs containing no sulfonate groups, is generally at least about 1.5% by weight of $—SO_3^-$, preferably from about 2.5 to 8% by weight of $—SO_3^-$, in particular from about 3 to 7% by weight of $—SO_3^-$, based on the weight of the anhydrous, copolymeric starting PVALs containing sulfonate groups, or anhydrous mixtures thereof with PVALs containing no sulfonate groups.

The starting PVALs carrying sulfonate groups on which the polyvinyl butyrals are based are preferably obtained by hydrolysis or alcoholysis of copolymeric, hydrolyzable polyvinyl esters, preferably polyvinyl acetates, containing comonomer units carrying sulfonate groups, preferably ethene sulfonate units. If desired, mixtures of the polyvinyl esters containing sulfonate groups with hydrolyzable polyvinyl esters containing no sulfonate groups, preferably polyvinyl acetates, which have a degree of hydrolysis of at least about 70 mol %, preferably up to 100 mol %, in particular from about 84 to 99 mol %, based on the number of mols of hydrolyzable vinyl ester units in the starting polyvinyl esters can be used to make the starting PVALs carrying sulfonate groups. The degree of acetalation of the polyvinyl butyrals is preferably up to about 86 mol %, in particular from about 60 to 80 mol % based on the total number of mols of acetalatable vinyl alcohol units in the starting PVAL. The viscosity of a 4% strength by weight aqueous starting PVAL solutions is generally in the range from about 2 to 100 mPa.s, preferably from about 2 to 70 mPa.s, in particular from about 3 to 60 mPa.s, as determined in a Höppler viscometer in accordance with DIN 53015 at 20° C. The viscosity of the plasticizer-free polyvinyl butyrals, determined on a 5% strength by weight ethanolic PVB solution in a Höppler viscometer is generally in the range from about 50 to 80 mPa.s in accordance with DIN 53015 at 23° C.

The polyvinyl butyrals containing sulfonate groups or mixtures thereof with commercially available polyvinyl butyrals containing no sulfonate groups are, surprisingly and advantageously suitable for production of glass laminating films, when blended with plasticizers and after plastication. The polyvinyl butyrals containing no sulfonate groups which are commercially available for laminating film production are polymers having a residual vinyl alcohol unit content from about 18 to 24% by weight and the viscosities of a 5% strength by weight ethanolic PVB solutions measured in accordance with DIN 53015 at 23° C., is in the range from about 50 to 80 mPa.s.

Plasticizers which can be used are generally all plasticizers which can be employed for commercially available polyvinyl butyrals. Examples are esters of triethylene glycol, preferably esters of adipic acid, phthalic acid or phosphoric acid. Preference is given to the 2-ethylbutyric and n-heptanoic esters of triethylene glycol, particularly preferably di-n-hexyl adipate.

The plasticizers are generally used in conventional amounts. The polymer/plasticizer mixtures can thus preferably contain from about 20 to 50% by weight, in particular from about 23 to 35% by weight of plasticizer although any suitable amount can be used.

The content of sulfonate groups in the polymer/plasticizer mixture can preferably be from about 0.01 to 5% by weight, in particular from about 0.1 to 2.5% by weight.

The plasticizer-containing polyvinyl butyral compositions of the present invention are preferably converted by extrusion with plastization into films which are advantageously suitable as interlayer films for the production of silicate laminated glass sheets. The polymer/plasticizer mixture is preferably extruded through a flat-film die to give a flat film having any desired thickness, generally having a thickness from about 0.2 to 2 mm, preferably from 0.3 to 0.8 mm. The extrusion temperature is generally in the conventional range, preferably between 140° and 230° C. Higher temperatures can also be reached briefly without any decomposition or discoloration of the films.

The polymer/plasticizer molding composition can generally contain conventional additives. For example, small amounts of alkali, preferably from about 0.001 to 0.1% by weight, based on the molding composition, of alkali metal hydroxide or alkaline alkali salt can be used. Furthermore known release agents, for example salts of carboxylic acids, in particular potassium and magnesium salts of formic acid or of acetic acid or salts of dicarboxylic acids, and certain silanes or siloxanes can also be used in the present invention. The concentration of these release agents is preferably between about 0.001 and 0.2% by weight, based on the polymer/plasticizer molding composition. Additional additives which may be contained in the polymer/plasticizer composition comprise stabilizers, e.g. emulgators, protective colloids, light (UV) stabilizers and auxiliaries, e.g. fillers, pigments, dyes, solvents, film forming aids.

The plasticizers are generally selected from the group consisting of diesters of di-, tri- or tetraethylene glycol with aliphatic $(C_6–C_{10})$-carboxylic acids, diesters of $(C_2–C_{12})$-dicarboxylic acids. Preferred plasticizers are adipic, sebacic or phthalic acid, with aliphatic $(C_4–C_{10})$-alcohols, aliphatic esters of fatty acids having a total of up to 40 carbon atoms. Particularly preferred plasticizers are dihexyl adipate. The polymer moldings are preferably in the form of flat films and preferably have a thickness of from about 0.2 to 2 mm, in particular from about 0.3 to 0.8 mm. The polymer moldings can generally contain conventional stabilizers, release agents and light stabilizers in the requisite amounts.

Plasticized polyvinyl butyral films containing sulfonate groups which have been prepared according to the invention exhibit an increase in flowability at 100° C. with increasing sulfonate group content compared with a comparative film produced from commercially available PVB containing no sulfonate groups. The measurement parameter here is the MFI 21.6 kg/100° C., measured using a Göttfert 011.5 melt flow index tester fitted with a 2 mm nozzle.

Plasticized polyvinyl butyral films according to the present invention containing sulfonate groups exhibit, compared with the comparative films containing no sulfonate groups, an increase in the film strength. This increase in film strength is evident from an increase in tensile stress at 150% or 200% elongation on the extruded films and can be measured, in spite of the increase in the flowability at 100° C.

The polyvinyl butyral films of the present invention containing sulfonate groups thus show a property profile which makes them appear particularly suitable for use as glass laminating films.

The present invention also relates to the use of the plasticized polymer moldings, preferably in the form of flat films preferably having a thickness from about 0.2 to 2 mm, in particular from about 0.3 to 0.8 mm, produced by thermoforming, as interlayer films in the production of multilayer laminated glass sheets. The multilayer laminated glass sheets are preferably silicate sheets, preferably in the form of motor vehicle windshields, glass windshields for ships, glass windshields for aircraft, architectural glass sheets for the construction industry, safety glass sheets and bulletproof glass screens.

The invention is described in greater detail by the examples below.

EXAMPLE 1

Preparation of a Polyvinyl Butyral Containing Sulfonate Groups 1120 g of a copolymeric polyvinyl alcohol (PVAL) containing monomer units of ethene sulfonate (degree of hydrolysis (DH): 96.7%, content of ethene sulfonate sodium salt 10.2% by weight ($\approx$6.3% by weight of $SO_3^-$), viscosity of the 4% strength by weight aqueous solution at 20° C.: 4.4 mPa.s) and 280 g of commercially available PVAL containing no sulfonate groups (Mowiol® 4–98 from Hoechst AG, viscosity: 4 mPa.s, degree of hydrolysis: 98%) are dissolved under nitrogen in 5600 g of water at 90° C. in a reactor fitted with stirrer and reflux condenser. The $SO_3^-$ content of the PVAL mixture is 5% by weight.

The solution is subsequently cooled to 1° C., 66 g of 85% strength by weight phosphoric acid are added, and 721 g of n-butyraldehyde are metered in over the course of 2 hours at such a rate that the temperature does not exceed 2.5° C. The reaction mixture is then warmed to 37° C. over the course of 3 hours and subsequently allowed to react at 37° C. for 2 hours. The mixture is subsequently adjusted to a pH of 6.5 by means of aqueous NaOH. The dispersion obtained has a solids content of 22.78% by weight. The mean particle diameter of dispersion is 0.88 µm). The mean particle diameter is determined by argon-xenon laser aerosol spectroscopy. The minimum film-formation temperature (MFT) is 11° C.

After freeze-drying, the resultant polyvinyl butyral can be isolated in the form of a colorless powder and comprises 73.3% by weight of n-butyral units, 18.9% by weight of vinyl alcohol units, 6.6% by weight of ethene sulfonate units and 1.2% by weight of vinyl acetate units.

The above percentages are calculated by means of the $SO_3$ content of the starting polyvinyl alcohols and by means of the residual vinyl acetate content of the acetals, determined by analysis, assuming a 100% conversion of aldehyde (the residual butyraldehyde content of the dispersions is in all cases determined by GC at <0.2% by weight).

EXAMPLE 2

Preparation of Polyvinyl Butyrals Containing Sulfonate Groups 240 g of a copolymeric polyvinyl alcohol (PVAL) containing monomer units of ethene sulfonate (degree of hydrolysis (DH): 97.5%, content of ethene sulfonate sodium salt: 5.73% by weight ($\approx$3.54% by weight of $SO_3^-$), viscosity of the 4% strength by weight aqueous solution at 20° C.: 5.6 mPa.s) are dissolved under nitrogen in 2160 g of water at 90° C. in a reactor fitted with stirrer and reflux condenser. The solution is subsequently cooled to 1° C., 12.8 g of 85% strength by weight phosphoric acid are added, and 125.2 g of n-butyraldehyde are metered in over the course of 2 hours at such a rate that the temperature does not exceed 2.5° C. The reaction mixture is then warmed to 30° C. over the course of 3 hours and subsequently allowed to react at 30° C. for 2 hours.

The polyvinyl butyral precipitated in finely divided solid form is filtered off with suction, washed with demineralized water and stirred for one hour in aqueous alkali metal hydroxide solution at pH 11. The polyvinyl butyral is subsequently refiltered off with suction, washed with demineralized water until neutral and dried at 50° C. in vacuo.

The resultant polyvinyl butyral is obtained in the form of a colorless powder and comprises 74.1% by weight of n-butyral units, 20.8% by weight of vinyl alcohol units, 4.1% by weight of ethene sulfonate units and 1.0% by weight of vinyl acetate units. The vinyl acetate units are determined by hydrolysis of the vinyl acetate units by means of excess alkali and back-titration.

EXAMPLES 3 TO 9

Production of Plasticized Polymer Molding Polymer Moldings From Plasticizer-containing Polyvinyl Butyrals Containing Sulfonate Groups, and Testing Thereof as Laminated Glass Interlayer Films

EXAMPLE 3 to 5

Pulverulent polyvinyl butyral (PVB) containing sulfonate groups from Example 2 having a vinyl alcohol unit content of 20.8% by weight and an ethene sulfonate unit content of 4.1% by weight is mixed with commercially available pulverulent standard polyvinyl butyral (standard PVB1) containing no sulfonate groups having a vinyl alcohol unit content of 19.9% by weight in the mixing ratios given below. The mixing ratio between "PVB from Example 2" and "standard PVB1", calculated in % by weight and based on the mixtures, is 10:90 in Example 3, 20:80 in Example 4 and 30:70 in Example 5. 26% by weight of the plasticizer triethylene glycol di-n-heptanoate, based on the plasticizer-containing mixture, is admixed with each of the pulverulent PVB mixtures from Examples 3 to 5 in a Brabender® mixer with plastication of the mixtures. The mixtures are extruded in a Haake® twin-screw extruder at a material temperature of 200° C. to give flat films with a thickness of 0.76 mm. The flat films obtained are tested for useability as glass laminate interlayer films. The tests are the flat film's flowability at 100° C. (MFI (melt flow index) 21.6 kg/100° C., 2 mm nozzle) and their elasticity behavior by determining the tensile stress of the films at 150% and 200% elongation from a stress-strain diagram, measured using an Instron® measuring instrument. The results are summarized in Table 1.

COMPARATIVE EXAMPLE 1

The procedure is as described in Examples 3 to 5, but the polyvinyl butyral employed is, by comparison, only "standard PVB1" containing no sulfonate groups to which 26% by weight, based on the plasticizer-containing mixture, of the plasticizer mentioned in Examples 3 to 5 are admixed. The resultant flat film is tested as described in Examples 3 to 5. The result is summarized in Table 1.

TABLE 1

| Flat film 0.76 mm thick, made from | Film Testing | | | |
|---|---|---|---|---|
| | Example 3 | Example 4 | Example 5 | Comparative Example 1 |
| MFI 21.6 kg/100° C. 2 mm nozzle | 327 mg/ 10 min | 484 mg/ 10 min | 507 mg/ 10 min | 252 mg/ 10 min |
| Tensile stress at | | | | |
| 150% | 7.2 MPa | 7.5 MPa | 8 MPa | 4.7 MPa |
| 200% | 13.7 MPa | 13.6 MPa | 13.6 MPa | 9.7 MPa |

As the results from Examples 3 to 5 show, in spite of a significant increase in the flowability of the films at 100° C. (cf. MFI values), the tensile stress of the films surprisingly likewise increases significantly, although it would have been expected to drop. This unexpected property allows the plasticized polyvinyl butyral films containing sulfonate groups of the present invention to be particularly suitable for use as glass laminate interlayer films.

EXAMPLES 6 to 9

Pulverulent polyvinyl butyral (PVB) containing sulfonate groups from Example 1 having a vinyl alcohol unit content of 18.9% by weight and an ethene sulfonate unit content of 6.6% by weight is mixed with commercially available pulverulent standard polyvinyl butyral (PVB2) containing no sulfonate groups, having a vinyl alcohol unit content of 20.45% by weight, in the mixing ratios below. The mixing ratio between "PVB from Example 1" and "standard PVB2", calculated in % by weight and based on the mixture, is 2.5:97.5 in Example 6, 5:95 in Example 7, 10:90 in Example 8 and 20:80 in Example 9.

24.5% by weight of the plasticizer dihexyl adipate, based on the plasticizer-containing mixture, is admixed with each of the pulverulent PVB mixtures from Examples 6 to 9 in a Brabander® mixer with plastication of the mixtures. The mixtures are extruded in a Haake® twin-screw extruder at a material temperature of 200° C. to give flat films with a thickness of 0.76 mm. The resultant flat films are tested for usability as glass laminate interlayer films in an analogous manner as described in Examples 1 to 3. The result is summarized in Table 2.

COMPARATIVE EXAMPLE 2

The procedure is as described in Examples 6 to 9, but the polyvinyl butyral employed is, by comparison, only "standard PVB2" containing no sulfonate groups to which 24.5% by weight, based on the plasticizer-containing mixture, of the plasticizer mentioned in Examples 6 to 9 are admixed. The resultant flat film is tested as described in Examples 3 to 5. The result is summarized in Table 2.

TABLE 2

| Flat film 0.76 mm thick, made from | Film Testing | | | | |
|---|---|---|---|---|---|
| | Example 6 | Example 7 | Example 8 | Example 9 | Comparative Example 2 |
| MFI 21.6 kg 100° C. 2 mm nozzle | 226 mg/ 10 min | 251 mg/ 10 min | 339 mg/ 10 min | 745 mg/ 10 min | 211 mg/ 10 min |
| Tensile stress at | | | | | |

TABLE 2-continued

| Flat film 0.76 mm thick, made from | Film Testing | | | | |
|---|---|---|---|---|---|
| | Example 6 | Example 7 | Example 8 | Example 9 | Comparative Example 2 |
| 150% | 9.1 MPa | 9.5 MPa | 10.7 MPa | 10.2 MPa | 8.0 MPa |
| 200% | 16.8 MPa | 16.9 MPa | 17.3 MPa | 16.2 MPa | 15.3 MPa |

The results from Examples 6 to 9 show, that the difference between the tensile stress values and Comparative Example 2 is less than in Table 1, since the low plasticizer content means that the tensile stress level is higher in Comparative Example 2 than in Comparative Example 1. The tensile stress values of Examples 6–9 are, however, likewise better than those of Comparative Example 2. Moreover, the flowability of the films at 100° C. (cf. MFI values) in Example 8 and 9 has surprisingly and advantageously risen much more than in the corresponding Examples 3 to 4, which can be regarded as a further advantage for use of the flat films as glass laminate interlayer films.

What is claimed is:

1. A plasticized polymer molding, comprising: a plasticizer and polyvinyl butyral which comprises comonomer units carrying sulfonate groups in the main polymer chain of said polyvinyl butyral, wherein said comonomer units carrying sulfonate groups comprise comonomer units of ethene sulfonate in the main polymer chain of said polyvinyl butyral.

2. A plasticized polymer molding as claimed in claim 1, wherein the polyvinyl butyral comonomer units carrying sulfonate groups are present in the form of their alkali metal salts.

3. A plasticized polymer molding as claimed in claim 1, which contains from about 20 to 50% by weight of said plasticizer, based on polyvinyl butyral.

4. A plasticized polymer molding as claimed in claim 1, which contains from about 20 to 50% by weight of said plasticizer, based on the polyvinyl butyral and wherein said plasticizer is selected from the group consisting of diesters of di-, tri- or tetraethylene glycol with aliphatic ($C_6$–$C_{10}$)-carboxylic acids, diesters of ($C_2$–$C_{12}$)-dicarboxylic acids with aliphatic ($C_4$–$C_{10}$)-alcohols, and aliphatic esters of fatty acids having a total of up to 40 carbon atoms.

5. A plasticized polymer molding as claimed in claim 1, wherein said molding a flat film having a thickness from about 0.2 to 2 mm.

6. A plasticized polymer molding as claimed in claim 5, further comprising one or more stabilizers, release agents and light stabilizers.

7. A plasticized polymer molding as claimed in claim 1, wherein the polyvinyl butyral further comprises, non-acetalated vinyl alcohol units in an amount from about 15 to 28% by weight, based on the weight of said polyvinyl butyral.

8. A plasticized polymer molding comprising a modified polyvinyl butyral and plasticizer, wherein said modified polyvinyl butyral is made by a process comprising the steps of:

acetalating a starting polyvinyl alcohol, which polyvinyl alcohol comprises polyvinyl alcohol containing monomer units carrying sulfonate groups, with butyraldehyde in an aqueous solution in the presence of acid catalysts to form polyvinyl butyral carrying sulfonate groups in the main polymer chain thereof, wherein said polyvinyl alcohol containing monomer units carrying sulfonate groups comprises polyvinyl alcohol containing monomer units of ethene sulfonate, and said polyvinyl butyral carrying sulfonate groups in the main polymer chain comprises polyvinyl butyral containing ethene sulfonate in the main polymer chain;

neutralizing said polyvinyl butyral carrying sulfonate groups to obtain a neutralized polyvinyl butyral in powder form;

mixing said neutralized polyvinyl butyral with plasticizers and optionally stabilizers and auxiliaries; and forming the mixture into a molding.

9. A plasticized polymer molding as claimed in claim 8, wherein said starting polyvinyl alcohol contains comonomer units carrying said sulfonate groups in salt form.

10. A plasticized polymer molding as claimed in claim 8, wherein said starting polyvinyl alcohol contains from about 0.01 to 25 % by weight of said comonomer units carrying said sulfonate groups, based on the weight of said starting polyvinyl alcohol.

11. A plasticized polymer molding as claimed in claim 8, wherein said starting polyvinyl alcohols comprise mixtures of polyvinyl alcohols containing sulfonate groups and polyvinyl alcohols containing no sulfonate groups, and the amount of polyvinyl alcohols carrying sulfonate groups is from about 2.5 to 35% by weight, based on the total amount of said polyvinyl alcohol.

12. A plasticized polymer molding as claimed in claim 8, wherein said starting polyvinyl alcohol is selected from the group consisting of polyvinyl alcohol containing sulfonate groups and mixtures of said polyvinyl alcohol containing sulfonate groups with polyvinyl alcohol containing no sulfonate groups, and the —$SO_3$— content from the sulfonate groups of the starting polyvinyl alcohol is at least about 1.5% by weight, based on the weight of anhydrous, starting polyvinyl alcohol.

13. A plasticized polymer molding as claimed in claim 8, wherein the polyvinyl alcohols containing monomer units carrying sulfonate groups are formed by hydrolysis or alcoholysis of copolymeric, hydrolyzable starting polyvinyl esters, said polyvinyl esters are selected from the groups consisting of polyvinyl esters containing comonomer units carrying sulfonate groups and mixtures of polyvinyl esters containing comonomer units carrying sulfonate groups with polyvinyl esters containing no sulfonate groups, and said polyvinyl esters have a degree of hydrolysis of at least about 70 mol %, based on the number of mols of hydrolyzable vinyl esters units in the starting polyvinyl esters, wherein the degree of acetalation of said polyvinyl butyral is up to about 86 mol %, based the total number of mols of acetalable vinyl alcohol units in the starting polyvinyl alcohol, and wherein the viscosity of a 4% concentration by weight of an aqueous starting polyvinyl alcohol is in the range from about 2 to 100 mPa.s 14. A process for the production of a plasticized polymer molding as claimed in claim 1, said process comprising the steps of:

acetalating starting polyvinyl alcohol, which polyvinyl alcohol comprises polyvinyl alcohol containing monomer units carrying sulfonate groups, with butyraldehyde in an aqueous solution in the presence of acid catalysts to form polyvinyl butyral carrying sulfonate groups in the main polymer chain thereof, wherein said polyvinyl alcohol containing monomer units carrying sulfonate groups comprises polyvinyl alcohol containing monomer units of ethene sulfonate, and said polyvinyl butyral carrying sulfonate groups in the main polymer chain comprises polyvinyl butyral containing ethene sulfonate in the main polymer chain;

neutralizing said polyvinyl butyral carrying sulfonate groups to obtain a neutralized polyvinyl butyral in powder form;

mixing said polyvinyl butyral with plasticizers, and optionally stabilizers and auxiliaries; and forming said mixture into a molding.

15. A process as claimed in claim 14, further comprising the steps of:

mixing said polyvinyl butyral carrying sulfonate groups with polyvinyl butyral containing no sulfonate groups prior to said forming step.

16. A process as claimed in claim 14, wherein said forming step further comprises thermoforming the plasticized polymer.

17. A process as claimed in claim 14, wherein said neutralized polyvinyl butyral powder is obtained by treatment of said polyvinyl butyral carrying sulfonate groups in dilute alkali hydroxide.

18. A process as claimed in claim 14, wherein said neutralized polyvinyl butyral powder is obtained by spray-drying or freeze-drying said polyvinyl butyral carrying sulfonate groups.

19. A laminated glass product comprising: the plasticized polymer molding as claimed in claim 1, shaped in the form of at least one flat film having a thickness from about 0.2 to 2 mm; and at least two glass sheets, wherein said at least one flat film is positioned and laminated between said at least two glass sheets to form said laminated glass windshield.

* * * * *